(12) United States Patent
Aiber et al.

(10) Patent No.: US 7,805,496 B2
(45) Date of Patent: Sep. 28, 2010

(54) AUTOMATIC GENERATION OF HYBRID PERFORMANCE MODELS

(75) Inventors: Sarel Aiber, Binyamina (IL); Dagan Gilat, Haifa (IL); Ariel Landau, Nesher (IL); Natalia Razinkov, Or-Akiva (IL); Aviad Sela, Yokne'am Ilit (IL); Segev Wasserkrug, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1541 days.

(21) Appl. No.: 11/125,523

(22) Filed: May 10, 2005

(65) Prior Publication Data

US 2007/0006177 A1   Jan. 4, 2007

(51) Int. Cl.
    *G06F 15/16* (2006.01)
(52) U.S. Cl. .................. 709/217; 709/248; 709/216
(58) Field of Classification Search .......... 709/217, 709/248, 216; 702/186
See application file for complete search history.

(56) References Cited

U.S. PATENT DOCUMENTS

| | | | |
|---|---|---|---|
| 6,477,483 B1 * | 11/2002 | Scarlat et al. | 702/186 |
| 6,694,288 B2 * | 2/2004 | Smocha et al. | 702/186 |
| 6,868,434 B1 * | 3/2005 | Terranova et al. | 709/203 |
| 6,898,556 B2 * | 5/2005 | Smocha et al. | 702/186 |
| 6,898,564 B1 * | 5/2005 | Odhner et al. | 703/21 |
| 7,107,187 B1 * | 9/2006 | Saghier et al. | 702/186 |
| 7,313,635 B1 * | 12/2007 | Zavalkovsky | 709/248 |

\* cited by examiner

*Primary Examiner*—Ario Etienne
*Assistant Examiner*—Sahera Halim

(57) ABSTRACT

A method for simulating a computer system includes defining a set of building blocks including models of components of the computer system. The set of building blocks is interconnected to produce a topological model of the computer system. A client transaction model is derived based on historical data, for generating simulated client requests to be processed by the topological model. A resource requirement model is produced based on the topological model and on the historical data, the resource requirement model simulating a resource utilization of the components of the computer system responsively to the generated client requests. A performance metric of the computer system is estimated by simulating the computer system using the simulated client requests and the resource requirement model.

17 Claims, 9 Drawing Sheets

AUTOMATIC GENERATION OF HYBRID PERFORMANCE MODELS

CROSS-REFERENCE TO RELATED APPLICATIONS

This application is related to U.S. patent application Ser. No. 10/696,512, filed Oct. 29, 2003 and to U.S. patent application Ser. No. 10/689,807, filed Oct. 20, 2003. These related applications are assigned to the assignee of the present patent application, and their disclosures are incorporated herein by reference.

FIELD OF THE INVENTION

The present invention relates generally to simulation of computer systems, and particularly to methods and systems for modeling, optimization and capacity planning in large-scale computer systems.

BACKGROUND OF THE INVENTION

Electronic Business ("e-business") is an increasingly common form of conducting commercial transactions. Numerous organizations provide web-sites that enable clients to perform a wide variety of commercial transactions over the Internet. E-business applications range from on-line retail shops, through on-line libraries, information services and financial services to various business-to-business applications.

The design, implementation and management of web services such as e-business applications typically involve workload analysis and capacity planning. For example, a family of performance management and capacity planning products for enterprise information technology (IT) applications called HyPerformix™ is offered by HyPerformix, Inc. (Austin, Tex.). Details regarding this product family are available at www.hyperformix.com.

Menascé and Almeida provide performance and availability predictive models for managing and planning the capacity of web services in "Capacity Planning for Web Services," Prentice Hall PTR, 2002, which is incorporated herein by reference. In particular, chapter 5, pages 175-204, describes capacity planning models. Chapter 6, pages 205-260, describes methods for characterization and analysis of the workload in web services.

Specifically concerning the e-business domain, Menascé and Almeida describe methods for analyzing and modeling of client behavior in e-business systems in "Scaling for E-Business," Prentice Hall PTR, 2000, chapter 2, pages 41-66, which is incorporated herein by reference. Methods for characterizing the workload in e-business systems are described in chapter 11, pages 325-354.

SUMMARY OF THE INVENTION

Embodiments of the present invention provide a simulation tool for modeling, planning and optimizing the configuration and performance of IT-sites, such as e-business sites, that comprise multiple computers and related hardware and software resources.

In some embodiments, a site planner models hardware and middleware components of the IT-site using predefined building blocks. The building blocks have variable features and parameters that can be set by the site planner or by automated modeling processes described hereinbelow. These blocks are interconnected to produce a topological model, which is part of the system model that simulates the IT-site.

The topological model comprises core infrastructure models that model hardware and middleware components of the IT-site, and logical models that model logical features such as routing, load balancing and dynamic bandwidth allocation policies. In addition to the topological model, the system model comprises a tier-level message breakdown model and a tier-specific resource requirement model, as will be explained below.

In some embodiments, some system components can be modeled by two or more alternative building blocks, with each building block offering a different level of complexity and detail. The appropriate building block is chosen by the planner.

Client behavior patterns and attributes are characterized and modeled, typically by automatically analyzing historical data logged by the IT-site. The resulting user behavior model comprises several client clusters, each comprising a probabilistic model of client request sequences. Each client request is then broken down into sequences of individual task invocations in the different tiers of the IT-site. (IT-sites may often be viewed as comprising several functional tiers such as web, application and database tiers.) For each task invocation, the required hardware/software resource utilization is determined and modeled. In some embodiments, the tier-level message breakdown model and the resource requirement model are determined from historical data logs using automatic learning methods.

The simulation tool generates simulated client requests, in accordance with the user behavior and attribute models, and submits them to the system model. The simulation tool thus simulates the functionality of the IT-site and evaluates its performance with respect to a predetermined set of business rules and metrics.

In some embodiments, the simulation tool optimizes the IT-related policies, business-related policies and/or system configuration parameters in order to improve the site's compliance with its business objectives.

Using the simulation tool and the modeling methods described herein, a site planner can test different hardware and software configurations, test different business rules and metrics, test different IT policies and run various "what-if" scenarios. The planner can also test the modeled IT-site against different client populations and client request patterns. The planner can plan the capacity of the site to match present and expected demand. Specific hardware and software resources of the site can be optimized so as to provide a cost-efficient configuration. The simulation tool can also be used to design a new IT-site per given specifications. Alternatively or additionally, the simulation tool can be invoked automatically by a system management program in order to determine how to allocate resources in response to dynamic changes in site conditions, such as failure of a system component.

Whereas conventional modeling techniques typically require large amounts of computer programming to produce a system model, the disclosed simulation tool and modeling methods enable a planner having only limited computer programming abilities to perform modeling, capacity planning and optimization of IT-sites. The disclosed simulation tool also reduces the time and effort required for performing these tasks.

There is therefore provided, in accordance with an embodiment of the present invention, a method for simulating a computer system, including:

defining a set of building blocks including models of components of the computer system;

interconnecting the set of building blocks to produce a topological model of the computer system;

deriving a client transaction model based on historical data, for generating simulated client requests to be processed by the topological model;

producing a resource requirement model based on the topological model and on the historical data, the resource requirement model simulating a resource utilization of the components of the computer system responsively to the generated client requests; and estimating a performance metric of the computer system by simulating the computer system using the simulated client requests and the resource requirement model.

In an embodiment, the computer system includes an electronic-business (e-business) web-site.

In another embodiment, defining and interconnecting the set of building blocks include receiving inputs from a planner using a graphical user interface (GUI) to construct the topological model.

In yet another embodiment, defining the set of building blocks includes defining core infrastructure models that simulate hardware and middleware components of the computer system, and modeling the infrastructure models using at least one of a state-machine model and a queuing network model.

In still another embodiment, defining the set of building blocks includes, for some of the components, defining two or more alternative building blocks having different levels of complexity.

In an embodiment, deriving the client transaction model includes deriving a user attribute model that produces user attributes to be inserted into the generated simulated client requests.

In another embodiment, deriving the client transaction model includes deriving a user behavior model including one or more session types, which include characteristic sequences of client request types, and wherein deriving the user behavior model includes:

defining simulated clients;

defining for each simulated client a session type frequency vector including relative frequencies of initiating the one or more session types by the simulated client; and classifying the simulated client in a client cluster responsively to the session type frequency vector.

In yet another embodiment, producing the resource requirement model includes producing a tier-level message breakdown model including sequences of tasks that are invoked by the respective client request types in the user behavior model.

Additionally or alternatively, producing the tier-level message breakdown model includes aggregating, for each client request type in the user behavior model, a plurality of task sequences invoked by the client requests that correspond to the client request type, and representing the plurality of task sequences in terms of a probabilistic graph. Further additionally or alternatively, producing the resource requirement model includes determining the resource utilization caused by the tasks in each of a plurality of tiers of the tier-level message breakdown model.

In an embodiment, producing the resource requirement model includes deriving a dynamic Bayesian network model responsively to the historic data.

In another embodiment, the method includes modifying at least one of the topological model, a business-related policy and an IT-related policy, so as to improve the estimated performance metric. Additionally or alternatively, estimating the performance metric includes automatically running a simulation, responsively to an event in the computer system, in order to evaluate a change in the performance metric due to modifying the at least one of the topological model, the business-related policy and the IT-related policy.

There is also provided, in accordance with an embodiment of the present invention, apparatus for simulating a computer system, including:

a user interface device, which is coupled to interact with a planner so as to define a set of building blocks including models of components of the computer system and to interconnect the building blocks so as to produce a topological model of the computer system; and an analyzer, which is coupled to produce a client transaction model based on historical data for generating simulated client requests to be processed by the topological model, to derive a resource requirement model based on the topological model and on the historical data, which is coupled to simulate a resource utilization of the components of the computer system responsively to the generated client requests, and to estimate a performance metric of the computer system by simulating the computer system using the simulated client requests and the resource requirement model.

There is additionally provided, in accordance with an embodiment of the present invention, a computer software product for simulating a computerized system, the product including a computer-readable medium, in which program instructions are stored, which instructions, when read by a computer, cause the computer to interact with a planner so as to define a set of building blocks including models of components of the computer system, to interconnect the building blocks so as to produce a topological model of the computer system, to produce a client transaction model based on historical data for generating simulated client requests to be processed by the topological model, to derive a resource requirement model based on the topological model and on the historical data, which is coupled to simulate a resource utilization of the components of the computer system responsively to the generated client requests, and to estimate a performance metric of the computer system by simulating the computer system using the simulated client requests and the resource requirement model.

There is also provided, in accordance with an embodiment of the present invention, a method for performing an interactive analysis of a computer system to devise an information technology solution applicable to the computer system, the method including:

defining a set of building blocks comprising models of components of the computer system;

interconnecting the set of building blocks to produce a topological model of the computer system;

deriving a client transaction model based on historical data, for generating simulated client requests to be processed by the topological model;

producing a resource requirement model based on the topological model and on the historical data, the resource requirement model simulating a resource utilization of the components of the computer system responsively to the generated client requests; and estimating a performance metric of the computer system by simulating the computer system using the simulated client requests and the resource requirement model.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

System Description

Figure 1:
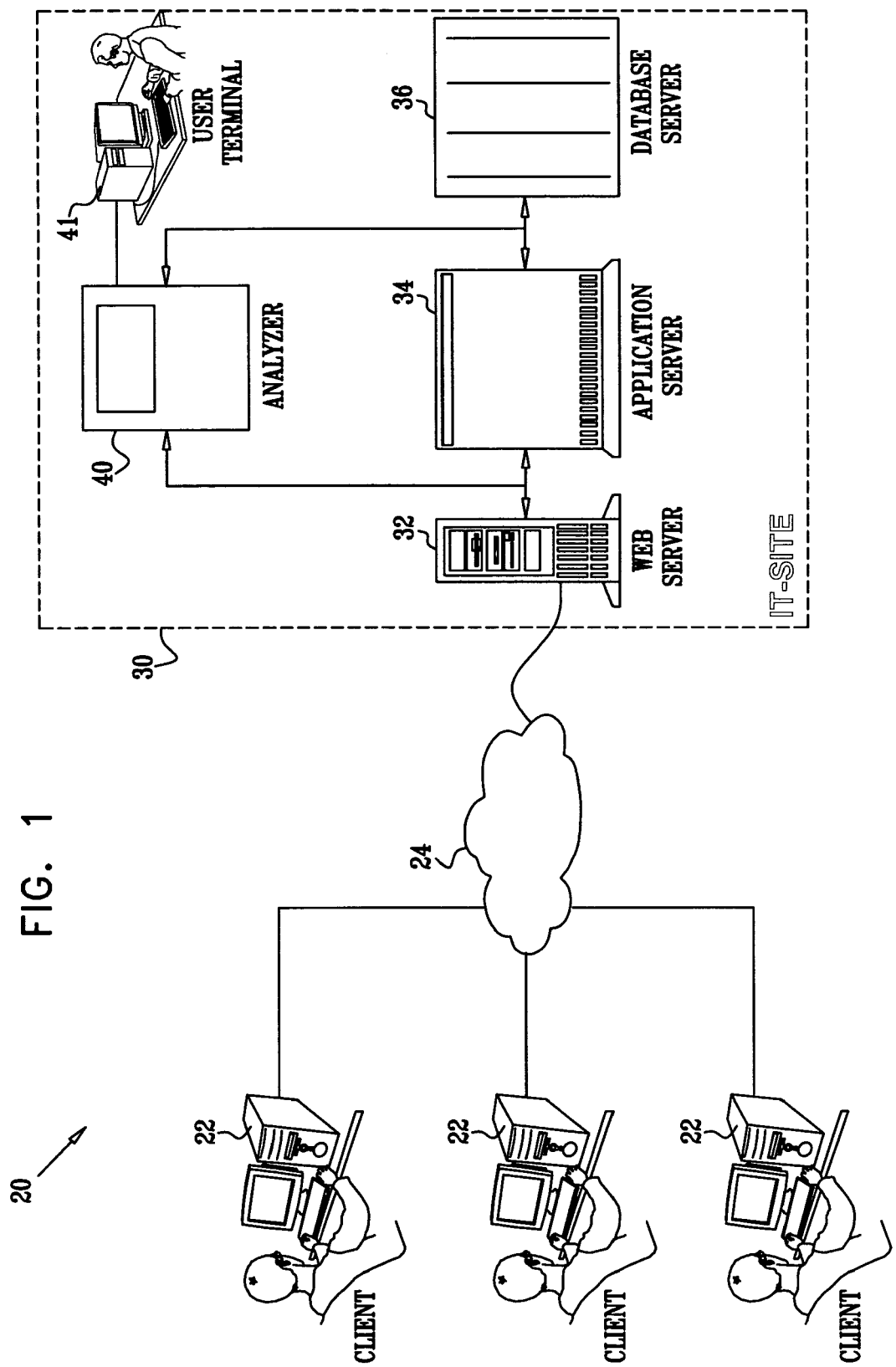
FIG. 1 is a block diagram that schematically illustrates an e-business computer system, in accordance with an embodiment of the present invention.

FIG. 1 is a block diagram that schematically illustrates an electronic business ("e-business") computer system 20, in accordance with an embodiment of the present invention. In the e-business system, clients 22 perform business transactions via a network 24, such as the Internet, with an IT-site 30. IT-site 30 may comprise an electronic commerce ("e-commerce") web-site such as an on-line book store, an on-line auction site, a site providing financial services such as on-line stock trading, or any other e-business application known in the art.

Site 30 can be structurally divided into three tiers, referred to as web, application and database tiers. In a typical transaction, a client request, sent by client 22, is received by a web server 32, which handles the web communication between clients 22 and site 30. An application server 34 processes the client request, according to the specific application of the site. As part of the application process, application server 34 typically queries a database server 36.

As an example for clarifying the web/application/database tier structure, assume that site 30 comprises an on-line stock trading site. In an exemplary transaction, client 22 asks to review quotes of stocks held in his portfolio in a request message to site 30. The request message is received by web server 32, which passes the request to application server 34. The application server queries database server 36 for the portfolio of client 22. The application server then retrieves from the database server a quote for each stock in the portfolio. The results are sent to web server 32, which formats and sends them over the Internet to the client's browser.

Being a commercial site, site 30 is set to fulfill certain business objectives. These objectives are typically defined and quantified as a set of business performance metrics. Such metrics comprise, for example, the total revenue per hour generated by the site, the revenue per visiting client, the fraction of transactions that ultimately end with a purchase, or the revenue lost by clients who "abandon" the site in the middle of a transaction.

In order to best achieve the specified business objectives, a properly designed e-business site should have a capacity that matches the requested transaction flow. In other words, the site's hardware and software resources should be optimized to match the required processing and communication required by the client requests. Under-specification of resources can cause the site to respond slowly to client requests and to provide low service quality, which directly translates into reduced revenues. In extreme situations, the site may deny service to clients or even crash under high-traffic conditions. On the other hand, over-specification of resources will unnecessarily increase the equipment cost and operational costs of the site, in comparison with the generated revenue.

The capacity required from site 30 often changes with time. Products and services offered by the site may change. The client activity profile may also change (as a result of a marketing campaign, for example). As a result of these and other changes, it is typically desirable to continuously optimize the capacity of the site, by allocating sufficient hardware and software resources to match the demand.

In some embodiments, a planner, such as a system administrator, performs capacity planning and/or optimization by modeling and simulating the structure and performance of site 30. The modeling and simulation are performed using a system simulation tool 42, which will be described below. The simulation tool models the hardware and software functions of site 30 as well as the flow of client requests and the resulting client sessions. Methods for modeling and simulating the different functions are described hereinbelow. In some embodiments, an analyzer 40 in site 30 monitors the operating conditions and the performance of the site as part of the capacity optimization process. In one embodiment, the modeling and simulation functions of simulation tool 42 are carried out by analyzer 40. Alternatively, modeling and simulation can be carried out by a different computer and use the information collected and/or analyzed by analyzer 40. In the description that follows, it will be assumed that the simulation tool is implemented on analyzer 40 itself. A user terminal 41, connected to analyzer 40, serves as a user interface device that is used by the planner to operate the simulation tool. In some embodiments, the user terminal is implemented as part of analyzer 40.

Although the IT-site described herein comprises three tiers, the disclosed methods and systems are not limited to three-tier sites. Site 30 may comprise any number of tiers. Each tier may comprise any number of servers, storage devices, communication devices and other hardware and software components. The hardware and software components can be interconnected in any suitable configuration, as required by the desired functionality and performance of the site.

Typically, analyzer 40 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, the modeling and simulation functions described herein may be implemented in dedicated hardware logic, or using a combination of hardware and software elements. The analyzer may be a standalone unit, or it may alternatively be integrated with other computing platforms of IT-site 30. Alternatively, the analyzer may be external to IT-site 30, and it may be used to provide analysis services to IT-site 30.

Simulation Tool and Building Blocks

Figure 2:
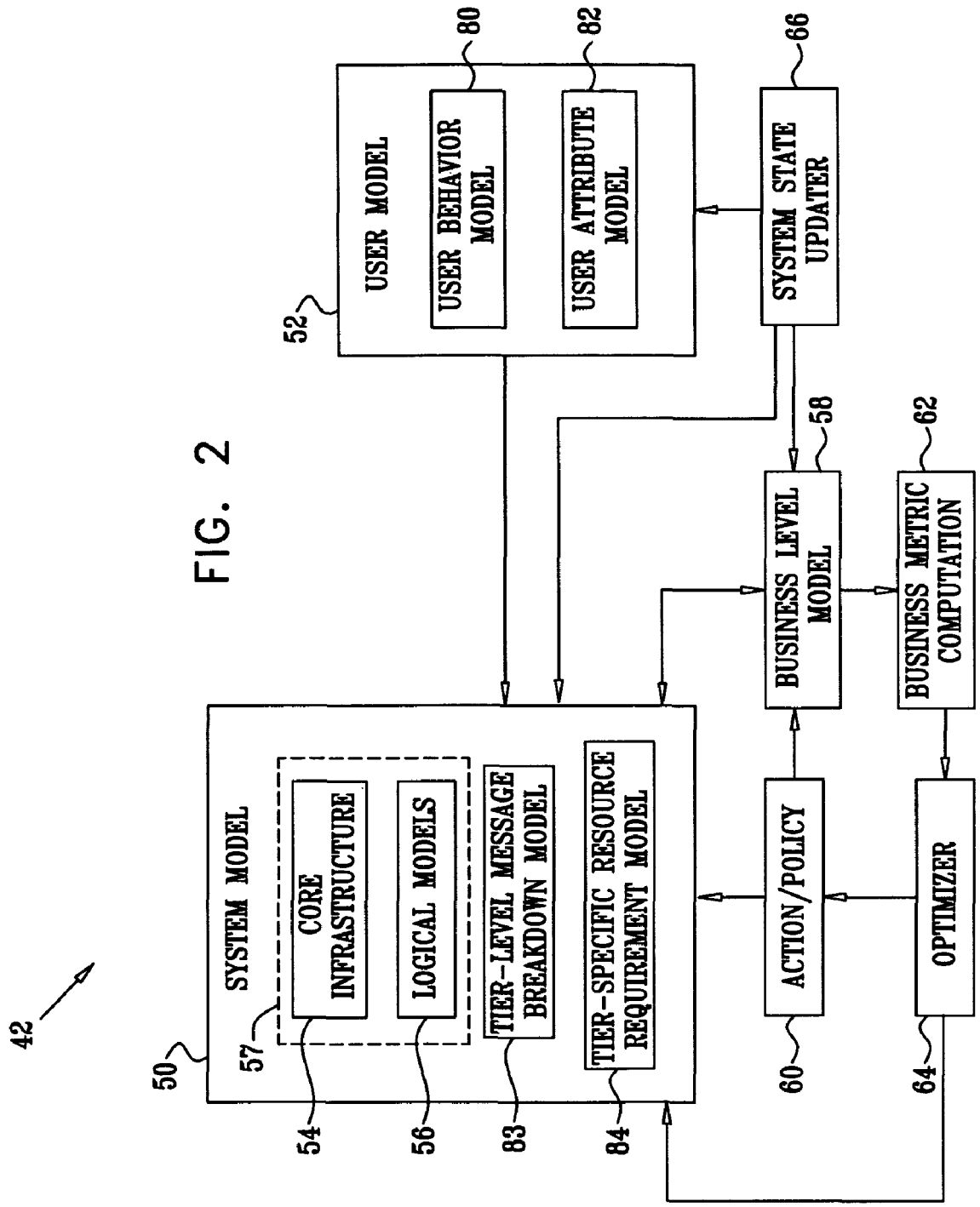
FIG. 2 is a functional block diagram that schematically illustrates a system simulation tool, in accordance with an embodiment of the present invention.

FIG. 2 is a functional block diagram that schematically shows details of system simulation tool 42, in accordance with an embodiment of the present invention. Some aspects of the functional structure of FIG. 2 are also described in U.S.

patent application Ser. No. 10/696,512 cited above. Further details of relevance to some embodiments of the present invention are also described by Landau et al., in "A Methodological Framework for Business-Oriented Modeling of IT Infrastructure," Proceedings of the 2004 Winter Simulation Conference, December 2004, Washington, D.C.; by Aiber et al., in "Business Objective Based Resource Management," Proceedings of the Thirteenth World Wide Web Conference, New-York, N.Y., May 17-22, 2004, pages 236-237; and by Aiber et al., in "Autonomic Self-Optimization According to Business Objectives," Proceedings of the 2004 International Conference on Autonomic Computing (ICAC'04), May 17-18, 2004, New-York, New-York, pages 206-213. All of these three papers are incorporated herein by reference. The process of constructing, training and operating the simulation tool is described below.

Simulation tool 42 enables the planner to model IT-site 30 and the client traffic submitted to it. Using the simulation, the planner can test different hardware and software configurations, test different business rules and metrics, test different IT policies, and run various "what-if" scenarios. The planner can also test the modeled IT-site against different client populations and client request patterns. For each tested configuration, the simulation tool evaluates the performance of the site in accordance with a set of predefined business rules. The simulation tool thus evaluates the compliance of the tested configuration with the business objectives of the site. By using the simulation tool, the planner can plan the capacity of the site to match present and expected demand. Specific hardware and software resources of the site can be optimized so as to provide a cost-efficient configuration. The simulation tool can also be used to design a new IT-site per given specifications.

Whereas conventional modeling techniques typically require large amounts of computer programming to produce a system model, the simulation tool and the modeling methods described herein enable a planner having limited computer programming abilities to perform modeling, capacity planning and optimization of IT-sites. The disclosed simulation tool also reduces the time and effort required for performing these tasks.

IT-site 30 with its hardware resources, software applications and functionality is modeled by a system model 50. (The client request traffic submitted to the site is modeled by a user model 52, which is described hereinbelow.) Model 50 comprises a topological model 57, comprising building blocks that model standard hardware and middleware components, and the logical processes and policies that connect them. Each building block comprises a pre-coded model that can be assigned different parameters by the planner, to suit the modeled component. Building blocks can be re-used with different parameters throughout the system model.

In some embodiments, simulation tool 42 comprises two or more alternative building blocks of some of the system components, with each building block offering a different level of complexity and detail. The appropriate building block is chosen by the planner when constructing the topological model. The planner may thus choose the appropriate trade-off between modeling accuracy and complexity for each building block. Depending on the selected level of detail, functions pertaining to one or more tiers of IT-site 30 may be included in a single building block.

The building blocks of topological model 57 comprise core infrastructure models 54 and logical models 56. Core infrastructure models 54 model the hardware (e.g., CPUs and disks) and middleware (e.g., web-, application- and database-servers) components of the site. In particular, the core infrastructure models model the cost (typically in terms of the required processing time) of performing operations in the modeled component. Modeled operations may comprise, for example, performing a database query or serving an HTTP (HyperText Transfer Protocol) request by a J2EE (Java 2 Platform Enterprise Edition) application server.

Logical models 56 simulate logical features such as routing, load balancing or dynamic bandwidth allocation policies implemented in site 30. These processes and policies typically have an impact on the site capacity and performance, and therefore should be considered as part of the simulation. In general, the logical models capture the functional behavior of the modeled components rather than the cost of performing operations in these components.

Core infrastructure models 54 and logical models 56 are thus jointly referred to as the topological model of site 30. In some embodiments, the planner constructs the topological model using a suitable graphical user interface (GUI) implemented as part of user terminal 41, such as a drag-and-drop interface.

A business level model 58 comprises a set of predefined business rules. For example, the business rules may define profit margins and commissions on sales. Rules may define the way poor service quality affects clients who leave the site, how penalties paid to clients for violating service-level agreements affect market-share, and how new customers join the site because of good reputation. Such rules, and many others that may be formulated, define the impact of IT-related events on the business objectives of the site. At any given time during the simulation, business level model 58 produces one or more business metrics, which quantify the performance of the site with respect to the business objectives.

A policy model 60 defines a set of tested policies and actions. Actions and policies may be either IT-related, business-related, or both. For example, a policy may comprise a queuing policy that determines the priority given to client requests based on certain attributes of the request, such as the client's identity, the type of Service-Level Agreement (SLA) or the purchase amount. A queuing policy may state that client requests that increase the site revenue are served first. Another type of policy may define the amount paid in penalties to customers in the event of poor service. An action may define, for example, the number of computers assigned to a certain tier, or the processor speed of these computers.

In some embodiments, the simulation tool attempts to optimize the policies and actions of policy model 60 and/or the resources of system model 50, so as to maximize the business metrics produced by business level model 58. A business metric computation block 62 accepts the business metrics from business level model 58 and converts them into a single composite metric for optimization. An optimizer 64 searches over alternative actions and policies of policy model 60, and/ or over alternative resource allocations in system model 50, attempting to maximize the composite metric.

In some embodiments, the optimizer treats the optimized parameters as a purely mathematical optimization task. In these embodiments, the higher-level meaning of the optimization is interpreted by policy model 60, which translates the result of the optimization to a policy or action applied to the system model.

A system state updater 66 updates the user model, system model and business level model to match the actual configuration of site 30.

Environment-Specific Models

In addition to the topological model, simulation tool 42 comprises a number of environment-specific models that are adapted to the specific site configuration and the specific client profile. The environment-specific models comprise a user behavior model 80, a user attribute model 82, a tier-level message breakdown model 83 and a tier-specific resource requirement model 84. The parameters of these models are typically derived by performing a statistical analysis of logged historical client session data, as will be explained below. An example showing the construction of all four models in an exemplary stock-trading application is given further below.

User behavior model 80 in user model 52 specifies the traffic patterns of client requests submitted to site 30. The behavior model simulates the characteristic navigation patterns of clients through the pages and/or menus of the IT-site. The simulation tool uses the behavior model at runtime to generate a flow of simulated client requests that resemble real life traffic, as will be shown below.

In some embodiments, the client population is divided into several characteristic clusters, each cluster exhibiting a characteristic behavior pattern. Each client cluster is modeled using a Customer Behavior Model Graph (CBMG), as described in the Menasce and Almeida references cited above. Alternatively, any other suitable method for modeling client behavior can be used to implement user behavior model 80.

Typically, the user behavior model defines sequences of client requests (referred to as "client sessions") as submitted to system model 50. Each client request typically comprises a user ID and is associated with a predefined "client request type." In some embodiments, the user behavior model monitors some of the simulation results provided by system model 50 in order to determine the arrival time of subsequent client requests. (For example, the arrival time of a subsequent request may depend on the time in which a previous request by the same user was answered.)

User attribute model 82 in user model 52 generates attributes, or parameters, which are inserted into the simulated client requests. The model typically generates attributes that affect the computation of business metrics. For example, in client requests that comprise purchase transactions in an e-commerce site, attributes may comprise the purchase amounts. As in the user behavior model, the client population is typically divided into several characteristic clusters. (The clusters are possibly, but not necessarily, identical to the client clusters of the user behavior model.) For each cluster, the user attribute model generates attributes in accordance with a predetermined set of attribute probability distributions. A detailed example of a user attribute model is described below.

User attribute model 82 is typically used in conjunction with user behavior model 80. Each time the user behavior model generates a client request, the user ID in the request is used to associate the request with one of the client clusters of the attribute model. (Typically, each user ID is uniquely associated with a single client cluster.) The user attribute model produces a set of attributes, according to the appropriate client cluster, and inserts them into the request. The client request, comprising the attributes, is then submitted to system model 50. In general, the user behavior model and the user attribute model can be viewed as a composite client transaction model that simulates the client requests submitted to system model 50.

Tier-level message breakdown model 83 is a model that breaks down the incoming client requests (as modeled by the user-behavior model) into invocations of methods and services (collectively referred to as "tasks") in the components of site 30. For example, when site 30 comprises a J2EE web application, such tasks may comprise Servlets, Java Server Pages (JSPs), Enterprise JavaBeans (EJBs) and database requests.

In some embodiments, the tier-level message breakdown model represents each client request type in the user behavior model in terms of a probabilistic graph. (For a clarifying example of this process, see the descriptions of FIGS. 6 and 7 below.) The nodes of the graph represent the tasks that are invoked by the specific client request type. The arcs of the graph represent the flow of invocations.

Invocations are typically classified into consecutive flows (i.e., a sequence of method invocations that take place in a specified order), caller/callee flows (i.e., an invocation of a method within another method) and producer/consumer flows (i.e., an invocation that triggers another invocation asynchronously, for example by posting a message into a message queue). More complex flows may be constructed using these three basic flow types. For example, parallel method invocations can be represented by at most one caller/callee flow followed by one or more producer/consumer flows.

For example, consider a task A that invokes a task P several times in a row. Each invocation of task P produces an asynchronous producer/consumer invocation, such as posting of a message into a message queue. The posted messages are consumed by a task C, with each message being consumed by a different and independently-executing instance of task C. Each instance of task P posts a message and then passes control to the next task (another instance of task P), or returns control back to task A. The instances of task P do not wait for the message to be consumed by the instances of task C. Likewise, each instance of the message-consumer task C executes independently of its siblings. In this way, all of the task sequences execute concurrently.

Although each individual task invocation is deterministic, the message breakdown model is modeled as a probabilistic graph in order to cover both changing parameter values of the individual invocations, and the logic (e.g., the code) of the invoked task.

Tier-specific resource requirement model 84 comprises resource-level (e.g. CPU, I/O) requirements per each tier-level request in the tier-level message breakdown model described above. The structure of a resource requirement model for a specific tier depends upon the way in which the tier has been modeled. As described above, each tier can be modeled in different levels of detail using one or more building blocks. In some configurations, a particular tier has its own dedicated resources (e.g., its own server or servers). In other configurations, the tier can share its resources with other tiers (e.g., several tiers implemented on the same hardware).

In some cases, the planner may choose to model a particular tier using a detailed queuing-network building block. In a detailed queuing network model, resource-sharing policies such as FIFO, round-robin scheduling and processor sharing are typically resolved by the queuing model itself. Therefore, specifying the model comprises defining the amount of dedicated service time required at each resource when invoking each task in the tier-level message breakdown model. Queuing network models are often used for modeling the web-server and application-server tiers.

In other cases, the planner may choose to model a particular tier using simpler "black box" building blocks. In such cases, a state-machine model is typically used. The model state is defined as the set of pending client requests (in other words, requests that have been received and not yet returned). The model changes its current state when a new request is received or when a processed request is returned to the client. The model typically comprises two functions:

A response time function denoted $f(R,\theta)$, wherein $\theta$ denotes the state of the modeled component, and R denotes a pending request. For each pending request R, $f(R,\theta)$ returns the state-dependent response time of request R. The response time returned by $f(R,\theta)$ for a request R is calculated as if request R had just arrived. The processing of client requests is assumed to be uniform in time. In other words, if the arrival of request R has triggered a transition into state $\theta$, and the lifetime of $\theta$ is, for example, 60% of $f(R,\theta)$, then request R is considered to be "60% completed" and the remaining processing time for R is 40% of $f(R, \theta')$.

A state-transition function $g(R,\theta)$, which returns a new state (denoted $\theta'$) of the modeled component as a function of the current machine-state 8 and of the request R that triggered the state-transition.

The description of FIG. 5 below shows how the four environment-specific models described above are used to generate characteristic client traffic and to evaluate the performance of IT-site 30 (as modeled by system model 50) under these traffic conditions.

Deriving Model Parameters from Historical Data

In some embodiments, the four environment-specific models are defined and parameterized by analyzing historical logged data of real life client sessions that is obtained from different sources in site 30. In these embodiments, the structure and parameters of the models are automatically determined by simulation tool 42, using various automatic learning methods, as will be explained below.

Automatic derivation of user behavior model 80 is typically based on the processing of historical log files. Several methods are known in the art for automatically deriving the parameters of the user behavior model. For example, Section 11.4 of Menascé and Almeida's book "Scaling for E-Business" cited above, pages 334-342, describes a method for automatically deriving CBMGs by processing HTTP log files obtained from various servers in the IT-site. The log files are merged and filtered so as to retain only relevant client requests. The client requests are partitioned into client sessions. A clustering algorithm is then used to classify the sessions to a relatively small number of CBMGs.

Simulation tool 42 can derive user behavior model 80 using this sort of automatic derivation or any other suitable method. The model typically comprises a set of characteristic session types. During simulation runtime, the user behavior model randomly selects session types, and then generates sequences of client requests that conform to the selected session types. When using CBMGs, the client requests are typically generated using a Markov transition graph, as is known in the art.

In some embodiments, the user behavior model comprises a session-type relative-frequency vector for each client. The vectors are also automatically derived from the historical log files. For each client, each component of the vector comprises the number of sessions of the corresponding session type that this client has initiated, divided by the total number of sessions. A distance function is defined between these vectors.

For example, the distance can be defined as the n-dimensional Euclidean distance, wherein n denotes the number of client session types. Using the defined distance function, a clustering algorithm, such as a k-means clustering algorithm, is applied to classify the clients into a number of disjoint clusters. This process thus divides the client population into clusters, with each cluster comprising a group of clients that statistically generate a similar blend of session types. (The k-means clustering algorithm is described, for example, by Hastie et al., in "The Elements of Statistical Learning," Springer, 2001, chapter 14, pages 461-463, which is incorporated herein by reference.) A session-type relative-frequency vector is assigned to each of these clusters. At runtime, whenever the user-behavior model generates a client arrival (i.e., a beginning of a new client session), the session type is randomly drawn according to the relative-frequency vector of the cluster the arriving client belongs to.

Figure 3:
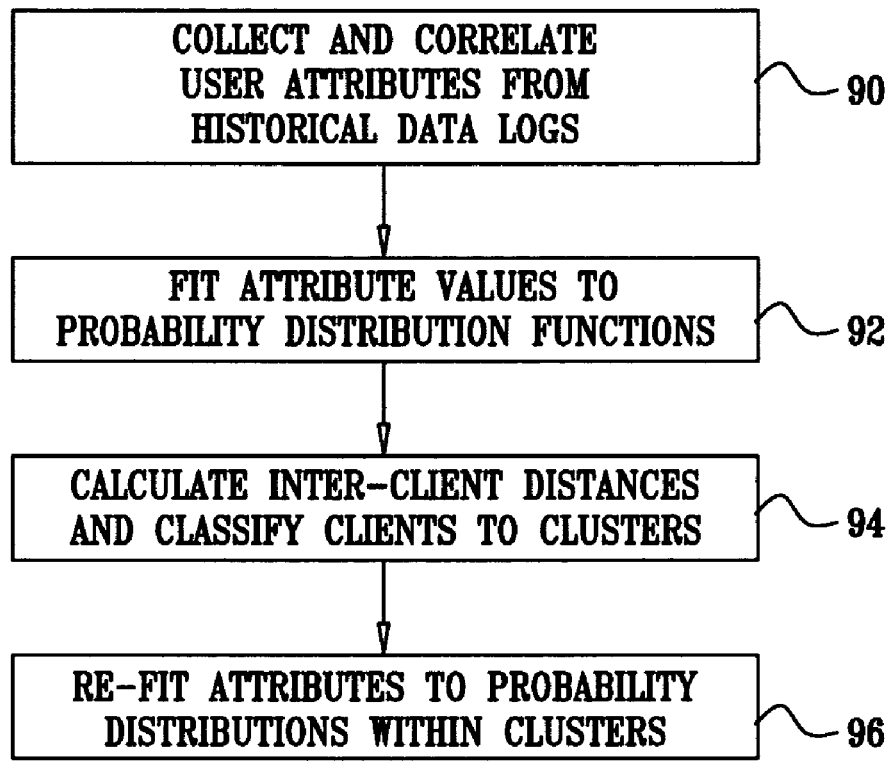
FIG. 3 is a flow chart that schematically illustrates a method for deriving a user-attribute model, in accordance with an embodiment of the present invention.

FIG. 3 is a flow chart that schematically illustrates a method for automatically deriving user-attribute model 82, in accordance with an embodiment of the present invention. The method begins with the simulation tool extracting and classifying user attributes associated with client requests, at a collection step 90. User attributes may comprise, for example, the client age, gender, type of SLA with the service provider of the IT-site, or any other property of the client that has an effect on the calculation of business metrics. In some embodiments, user attributes are extracted and correlated from multiple sources in IT-site 30. User attributes are often stored in application databases and/or in data stores of monitoring applications. An exemplary monitoring application that can be used in this context is the Tivoli Web-Site Analyzer (TWSA) offered by IBM Corp. (Armonk, N.Y.). Additional details regarding TWSA are available at www-306.ibm.com/software/tivoli/products/web-site-analyzer. User attributes are also stored in logs produced by web-servers, application-servers, or by the applications themselves. User attributes also often appear explicitly in client HTTP requests. Such attributes can be gathered, for example, by using Java filters, as is known in the art. All of these sources are collectively referred to herein as "historical data."

Monitoring applications such as TWSA also provide the means to correlate user attribute data gathered from different historical data sources. As described above, the user attributes selected for inclusion in the user attribute model are typically those which have an impact on the business objectives of site 30. In some embodiments of the present invention, simulation tool 42 identifies these attributes and extracts them from the appropriate sources in site 30.

The simulation tool fits the extracted attributes to probability distribution functions, at a fitting step 92. For each attribute and client pair, the simulation tool fits values of the attribute, extracted from the historical data logs that pertain to the particular client, into standard probability distribution functions. This process condenses large bodies of historical data into a compact representation. In some cases, such as when a certain attribute always takes the same value for a given client, the distribution function is degenerated to a single deterministic value. Alternatively, the simulation tool can use empirical distributions, in particular when the historical data logs are not exceedingly large. Empirical distributions are well known statistical tools. These methods are described, for example, by Zhou in "Empirical Distributions," which is available at www.ms.uky.edu/~mai/java/stat/EmpDis.html, and by Siegrist in an on-line course entitled "Virtual Laboratories in Probability and Statistics," which is available at www.math.uah.edu/stat.

Standard automatic distribution fitting algorithms are described, for example, by Brownlee in "Statistical Theory and Methodology in Science and Engineering," second edition, Robert E. Krieger Publishing Company, 1984, which is incorporated herein by reference. Some commercially-available software tools provide distribution fitting. Such tools include, for example the Stat::Fit and the ExpertFit software tools. Further information regarding these tools is available in www.geerms.com and www.averill-law.com/ExpertFit-distribution-fitting-software.htm, respectively.

The simulation tool classifies the clients into clusters based on the fitted distribution functions, at a clustering step 94. The simulation tool first defines a distance between two clients with respect to their attributes. The distance between two clients is defined as the multi-dimensional distance between the two sets of client attribute distribution functions (e.g., the sum of the differences between individual attribute values, the maximum of these differences, the square-root of the sum of squares of the differences, etc.) The distance between the probability distributions is calculated using a standard statistical similarity test such as Chi-square. Based on this inter-client distance function, clients are classified into a collection of disjoint clusters, by applying any suitable clustering algorithm (such as the k-means clustering algorithm described above). Note that these client clusters are based on attribute values and are typically different from the client clusters of the user behavior model, which were based on navigational patterns.

For each attribute and for each cluster of clients, the simulation tool calculates a new probability-distribution fitting, at a re-fitting step 96. The re-fitting process can use similar fitting methods as used in fitting step 92 above. In the present step, however, the historical data to be fitted comprises the set of all values of the relevant attribute across all the clients in the cluster.

Having automatically derived the user attribute model, the simulation tool can typically discard the historical data. At runtime, only the probability-distribution functions are used to generate attributes that are inserted into the simulated client requests.

Figure 4:
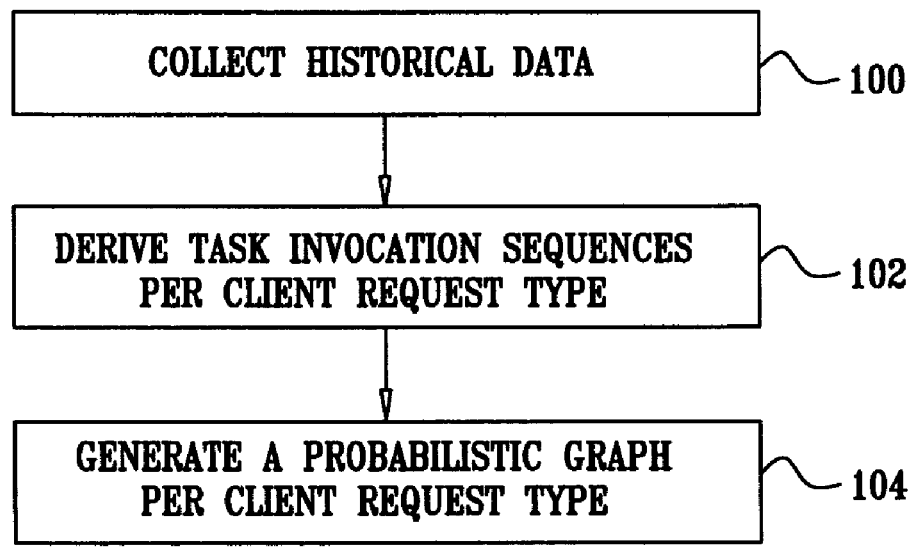
FIG. 4 is a flow chart that schematically illustrates a method for deriving a tier-level message breakdown model, in accordance with an embodiment of the present invention.

FIG. 4 is a flow chart that schematically illustrates a method for automatically deriving tier-level message breakdown model 83, in accordance with an embodiment of the present invention. The method begins with the simulation tool collecting historical data, at a collection step 100. The simulation tool scans historical data logs that record the processing of actual client requests. For each request, the simulation tool observes the sequence of tier-level tasks that the request processing has triggered in the different tiers of site 30, at a task derivation step 102. For example, in a three-tier J2EE web application, invoked tasks may comprise the different Uniform Resource Identifiers (URIs) installed on the web server, the JSP files, servlets and EJBs installed on the application server, and the message queues and databases used by the application.

In some embodiments, the simulation tool collects information on actual task invocations by monitoring, in isolation, the processing of a sample of client requests. Additionally or alternatively, the simulation tool can use middleware inspection tools, such as tracing facilities at the application-server level. Further additionally or alternatively, the simulation tool can use commercially-available software tools such as the Tivoli Monitoring for Transaction Performance (TMTP) software, offered by IBM Corp. Additional details regarding the TMTP software can be found in www-306.ibm.com/software/tivoli/products/monitor-transaction. The TMTP tool is also capable of correlating information from different sources. This correlation capability is desirable in cases in which the analyzed application is deployed in a distributed configuration. Tools such as TMTP are also capable of correlating a set of task invocations to the client request to which they belong. In this case the execution of monitored client requests need not be performed in isolation.

The simulation tool combines the observed sequences of task invocations of each client request type into a single probabilistic graph, at a graph derivation step 104. This process is repeated for each type of client request. The resulting model comprises a graph per each client request type. The process of combining the multiple observations into a single graph typically applies business-process discovery algorithms, as are known in the art. Such algorithms are described, for example, by Golani and Pinter in "Generating a Process Model from a Process Audit Log," Proceedings of the First International Conference on Business Process Management (BPM 2003), Eindhoven, The Netherlands, Jun. 26-27, 2003, pages 136-151, and in U.S. Patent Application Publication US 2004/0260590 A1, whose disclosures are incorporated herein by reference. Using such algorithms, patterns that are common to all observed sequences are typically factored out, enabling multiple sequences to be represented by a single graph.

For the remaining portion of the graph (referred to as the "random" part), a probability distribution is fitted. The simulation tool can use any suitable distribution fitting method, such as maximum-likelihood least-squares methods, or the distribution fitting methods and tools described above. The fitted distribution may comprise the empirical frequency of each invoked task, or a more elaborated distribution-fitting. For example, assume that all the observed task invocation sequences that correspond to a certain client request type differ only by the number of times a particular task is invoked in a loop (i.e., the size of the loop). In this case the tier-level message breakdown graph of this request type would comprise all the invocations that are common to the observed sequences, along with a distribution function that best represents the loop size. (An example of modeling such a loop is shown in FIG. 7D below.)

In some embodiments, there is a dependency between tier-level message breakdown and some of the user attributes. For instance, a certain client request may be broken down differently into task invocations when submitted by customers having different SLA agreements. As one example, the approval cycle of a loan for a platinum customer may differ from that for a gold customer. In these cases, the client request types are redefined so that two instances of a client request are interpreted as belonging to the same request type if and only if they were submitted by clients that belong to the same cluster of the user attribute model.

Derivation of tier-specific resource requirement model 84 comprises defining, for each task that appears in the tier-level message breakdown model, the resource utilization requirements of the different resources of core infrastructure models 54. As noted above, the core infrastructure components can be modeled either as detailed queuing-network building blocks or as simpler "black box" models.

For components modeled as queuing networks, deriving the resource requirement model comprises measuring the relevant resource-utilization parameters. (Such parameters comprise, for example, the CPU time required for a thread to process a given task invocation, or the average CPU utilization during a time frame.) In a properly designed queuing-network model these parameters are typically independent of the system workload. In some embodiments, the simulation tool measures the resource-utilization parameters directly using standard operating-system reporting tools.

Additionally or alternatively, the simulation tool can use dynamic instrumentation techniques known in the art to estimate some of the parameters. The term "dynamic instrumentation" refers to a process in which a software thread makes a detour from the code it is executing (at predetermined points in the code called "instrumentation points") to execute a measurement code (commonly referred to as a "probe"). The term "dynamic" is used specifically to refer to instrumentation methods in which individual probes can be turned on and off during code execution. For example, version 5.2 of the IBM Tivoli Monitoring for Transaction Performance (TMTP) tool described above provides support for dynamic instrumentation of J2EE applications. This feature is called "Just in Time Instrumentation" (JITI). Further details are available in an IBM Redbook by Moeller et al. entitled "End-to-End E-business Transaction Management Made Easy," December 2003, section 3.3.2, pages 72-76, which is incorporated herein by reference. This publication is available at www.redbooks.ibm.com/redbooks/pdfs/sg246080.pdf.

Other methods for indirectly inferring low level resource-utilization parameters using coarser measurements are described in U.S. patent application Ser. No. 10/689,807 cited above.

For components modeled as "black box" building blocks, the simulation tool typically uses a state-machine model, as described above. In some embodiments, derivation of the resource requirement model for such components comprises representing the component as a Bayesian Network. Learning model parameters using Bayesian networks is described, for example, by Ghahramani in "Learning Dynamic Bayesian Networks," in "Adaptive Processing of Sequences and Data Structures. Lecture Notes in Artificial Intelligence," Giles and Gori (editors), Springer-Verlag, Berlin, Germany, pages 168-197, which is incorporated herein by reference. An overview of techniques for learning Bayesian networks from data is given by Heckerman in "A Tutorial on Learning with Bayesian Networks," Microsoft Research Technical Report MSR-TR-95-06, July 1995, which is incorporated herein by reference.

As a clarifying example for this process, the following description shows the automatic derivation process of a Bayesian model representing a DB2™ database. The simulation tool first defines a feature vector denoted $\eta$. Vector $\eta$ typically comprises all system parameters that are considered relevant to the computation of the response-time function $f(R,\theta)$ defined above. The feature-vector components are valid within the lifetime of the client request R. (In the present example R comprises a database request.) The following table lists the contents of vector $\eta$:

| Candidate parameter | Description | Measurement source |
|---|---|---|
| $\eta_{type}$ | R request type | DB2 event log |
| $\eta_N$ | Total number of active requests | DB2 event log |
| $\eta_c$ | Total estimated cost of all active requests | DB2 Explain |
| $\eta_s$ | Total number of requests that start service | DB2 event log |
| $\eta_e$ | Total number of requests that complete service | DB2 event log |
| $\eta_{CPU}$ | Total system CPU utilization | Operating System |

-continued

| Candidate parameter | Description | Measurement source |
|---|---|---|
| $\eta_{CPU-BG}$ | Background CPU utilization | Operating System |
| $\eta_k$ | Database cache hit ratio | DB2 Snapshot |
| $\eta_{rd}$ | Database total number of read rows | DB2 Snapshot |
| $\eta_{wr}$ | Database total number of written rows | DB2 Snapshot |
| $\eta_p$ | Database total number of pre-fetched pages | DB2 Snapshot |
| $\eta_r$ | Response time | DB2 event log |

Having defined the feature vector, the simulation tool reduces the size, or dimensionality of the vector by discarding candidate parameters that are found irrelevant or insignificant to the computation of function $f(R,\theta)$. Identification of the irrelevant parameters is typically performed by applying statistical correlation methods to the historical data. (Historical data in this context means records of past client requests, along with the actual measured resource utilization figures for these requests.) Such methods are described, for example, in chapter 5, pages 115-127 of the book by Hastie et al. cited above.

Using the reduced-size feature vector, the simulation tool derives a Bayesian network model of the DB2 database resource requirements. Derivation of the model follows methods which are known in the art and are described in the papers by Ghahramani and Heckerman cited above. Such methods are also described by Pearl in "Probabilistic Reasoning in Intelligent Systems," Morgan Kaufmann, 1988, chapter 3, pages 116-131, which is incorporated herein by reference.

Simulation Method Description

Figure 5:
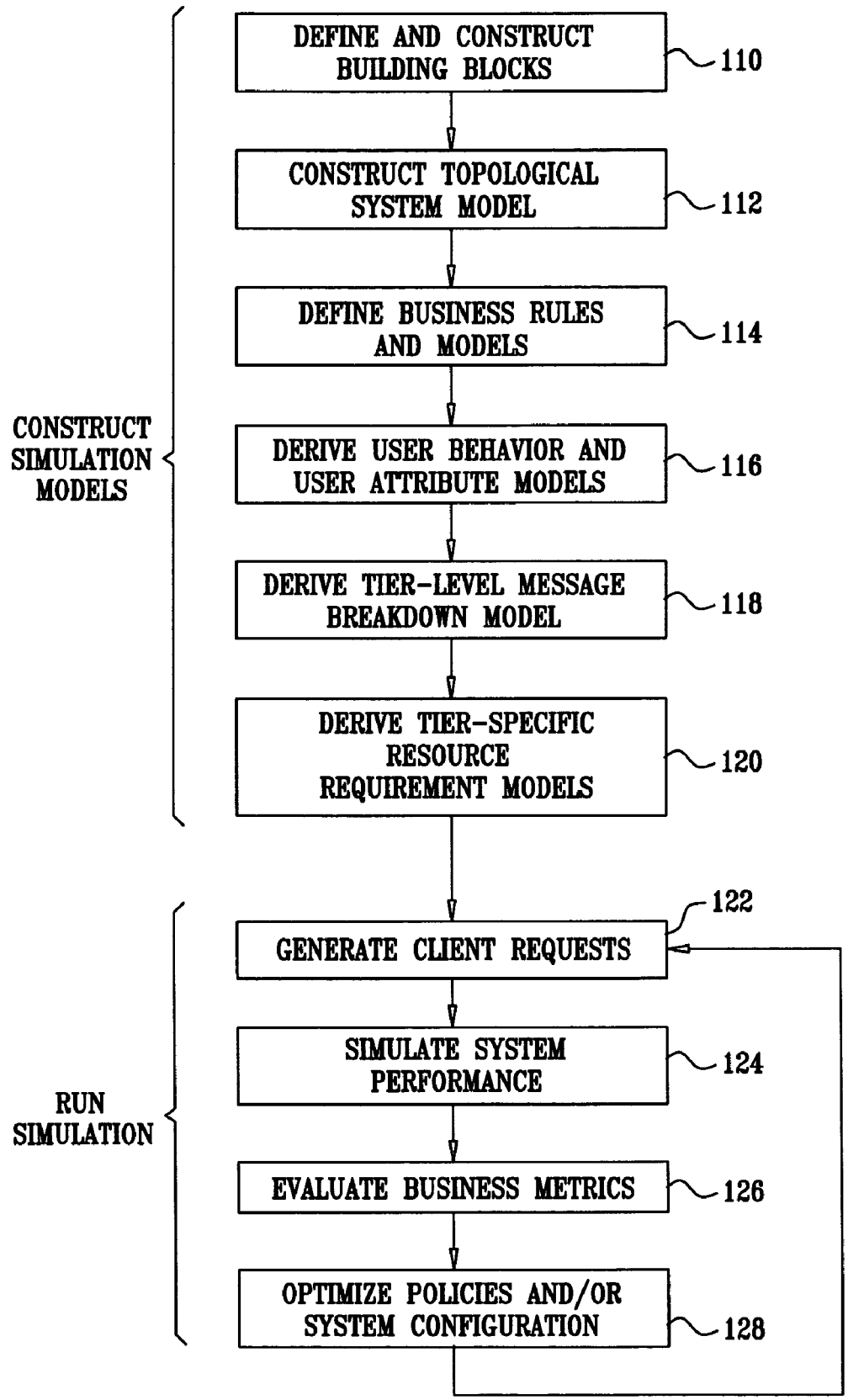
FIG. 5 is a flow chart that schematically illustrates a method for simulating an IT-site, in accordance with an embodiment of the present invention.

FIG. 5 is a flow chart that schematically illustrates a method for simulating IT-site 30 using simulation tool 42, in accordance with an embodiment of the present invention. Steps 110-120 of FIG. 5 are preparatory steps, in which the various system models are derived, as will be described below. Steps 122-128 comprise the simulation run-time steps.

The method begins with the planner defining and constructing the building blocks of topological model 57, at a block definition step 110. The planner models each hardware and software component of site 30 using core infrastructure models 54 and logical models 56, as detailed in the description of FIG. 2 above. The planner may choose the appropriate level of detail when modeling each component. After choosing the desired building block for each component, the planner assigns appropriate parameters and other configuration settings to the block.

The planner interconnects the modeled building blocks to produce the topological model, at a topological construction step 112. By interconnecting the building blocks, the planner defines the relationships and the data flow between them. The output of steps 110-112 is a simulated topological model of site 30.

The planner defines a set of business rules and metrics, at a business rule definition step 114. As stated in the description of FIG. 2 above, the business rules define the impact of IT-related events on the business objectives of site 30. The set of business rules define one or more business metrics that quantify the business-related performance of the site.

The simulation tool derives user behavior model 80 and user attribute model 82, at a user modeling step 116. An exemplary method for automatic derivation of the user attribute model is shown in FIG. 3 above. Next, the simulation tool derives tier-level message breakdown model 83 from the historical logged data, at a breakdown derivation step 118. The implementation of step 118 can follow the method shown in FIG. 4 above. Having derived the tier-level message breakdown model, the simulation tool derives the tier-specific resource requirement model, at a resource requirement derivation step 120. The derivation of the various models in steps 116-120 can use the automatic derivation methods described hereinabove, or any other suitable model derivation methods known in the art.

Once system model 50 is completed and the different models are derived, the simulation runtime begins. The simulation tool generates client requests at a traffic generation step 122. The flow of client requests is generated in accordance with the user behavior model and the user attribute model. Typically, client IDs are generated at random and associated with the predefined client clusters. For each client, requests are generated in accordance with the behavior model (such as CBMG) that corresponds to the client's cluster. The simulation tool uses the user attribute model to insert appropriate attributes into the client request. The generated client requests are submitted to system model 50.

The simulation tool simulates the performance of IT-site 30 in response to the client requests, at a performance simulation step 124. Using the different building blocks of system model 50 and the interconnections between them, the simulation tool simulates the processing of the client requests by site 30. In particular, the simulation tool calculates the processing time required at each system component for performing each task invoked by each client request. During the performance simulation, business level model 58 evaluates the performance of the simulated system in terms of the predefined business rules, in accordance with the policies defined by policy/action model 60.

The simulation tool then evaluates the predefined business metrics, at a metric evaluation step 126. The metrics are generated by business level model 58, in accordance with the policies defined by policy/action model 60, and combined into a single metric by business metric computation block 62. This process is further detailed in U.S. patent application Ser. No. 10/696,512 cited above.

The simulation tool optimizes the policies and or the configuration of system model 50, at an optimization step 128. In some embodiments, optimizer 64 modifies the policy definitions of policy model 60 in order to improve the performance of the simulated-system, with respect to the business metrics. Additionally or alternatively, optimizer 64 modifies the configuration of system model 50 in order to improve the business metrics. In some embodiments, the planner predefines parameter ranges for the policies and system configurations over which the optimizer can search. Additionally or alternatively, the optimizer can use autonomous or semi-autonomous methods for identifying the parameters to optimize and for performing the optimization.

After each optimization step 128, the simulation returns to traffic generation step 122. The simulation process continues with the simulation tool generating new client requests and simulating the performance of the site, in accordance with the optimized policies and/or configuration. In some embodiments, the simulation terminates when one or more of the business metrics reach a predefined threshold.

The simulation flow described by FIG. 5 is an exemplary flow. The simulation steps can also be performed in different sequences for different goals. For example, in some embodiments the planner may use the simulation tool to test a particular "what-if" scenario. In this case, the planner typically defines the desired system model, business rules, metrics and policies. The simulation tool evaluates the site performance for the particular scenario without optimizing. In another embodiment, the planner can test the simulated system against a particular user behavior model, user attribute model, message breakdown model or resource requirement model. In such cases, the planner can specify one or more of these models explicitly, rather than have the simulation tool derive them from historical data. Other sequences and variants of using the simulation tool will be apparent to those skilled in the art.

Modeling Example

The following example demonstrates the structure of the different models in simulation tool 42 and the relationships between the models and the simulation process described above. In the present example, IT-site 30 comprises an on-line stock trading application. The user behavior model assumes the following:

The system has 900,000 clients.

The initiation of user sessions follows a Poisson process having an intensity of 62.5 new sessions per second. (This intensity corresponds to an average of two daily sessions per client per day during an 8-hour trading day.)

There are two types of client sessions: Browse Portfolio (comprising 70% of the sessions) and Stock Purchase (comprising 30% of the sessions).

The "client think time" (i.e., the time elapsed between the receipt of a response by a client and the issuance of a subsequent request by the same client, within the same session) is a random variable, uniformly distributed between 0.5 and 8 seconds.

Figure 6A:
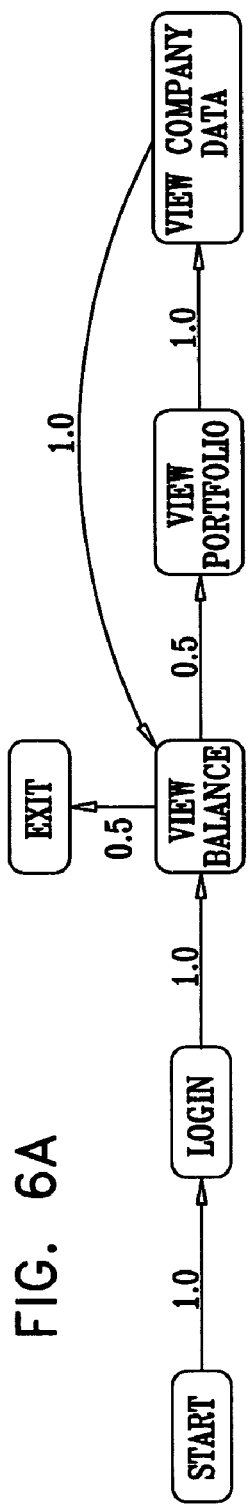
FIGS. 6A and 6B are state diagrams that schematically illustrate user behavior model graphs, in accordance with an embodiment of the present invention.

FIG. 6A is a state diagram that schematically illustrates a client behavior model graph (CBMG) that models the "Browse Portfolio" session type, in accordance with an embodiment of the present invention. This session type describes the 70% of the sessions in which the client only browses through his portfolio and leaves the site without purchasing new stocks. Each client request type used in this session type is represented by a state in the diagram. Arrows between states represent state transitions, corresponding to the client navigation through the site. The arrows are marked with probability values that represent the probability of performing the particular transition, or navigation. The states and probabilities are typically automatically derived from historical logged data, as described above.

The CBMG of FIG. 6A comprises six client request types, namely "START," "LOGIN," "VIEW BALANCE," "EXIT," VIEW PORTFOLIO" and "VIEW COMPANY DATA." Each client session can be viewed as a path through the graph. For example, a client enters the site using the "START" request. The client then logs into his account using the "LOGIN" request and views his current balance using the "VIEW BALANCE" request. Then, the client may leave the site using the "EXIT" request (with 50% probability) or continue to view his portfolio summary (with 50% probability). Clients who view their portfolio can continue to view data pertaining to a specific company in the portfolio. The relative frequency of each session is determined by the cumulative probabilities of the state transitions along the path. The CBMG of FIG. 6A is a simplified exemplary graph. Real life CBMGs are typically much more complex and comprise many more transition possibilities. For example, in real life CBMGs the client can move to the "EXIT" state, i.e., leave the site, from any state.

Figure 6B:
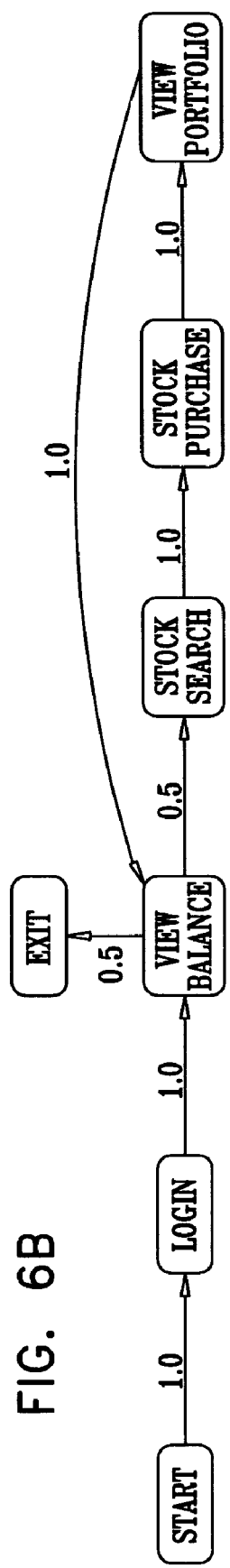

FIG. 6B is a state diagram that schematically illustrates a client behavior model graph (CBMG) that models the "Stock Purchase" session type, in accordance with an embodiment of the present invention. This session type comprises two additional client request types, namely "STOCK SEARCH" and "STOCK PURCHASE" and does not include the "VIEW COMPANY DATA" type. This session type describes the 30% of sessions that purchase stocks using site 30.

The user attribute model in the present example comprises two attributes: The client's Service-Level Agreement (SLA) and the client's monthly average spending. The SLA attribute can take three possible values: "platinum," "gold" or "regular." The monthly average spending attribute can be chosen from three possible Gaussian distributions (wherein μ denotes the mean and σ denotes the variance of the distribution):

μ=$50,000, σ=$10,000, referred to as "heavy" monthly spending.

μ=$5,000, σ=$1000, referred to as "medium" monthly spending.

μ=$1,000, σ=$200, referred to as "light" monthly spending.

The user behavior model is thus represented by a set of nine clusters. Clients are divided into clusters according to the following table:

|  | Heavy Spenders | Medium Spenders | Light Spenders | Total |
|---|---|---|---|---|
| Platinum | 2.5% | 5% | 2.5% | 10% |
| Gold | 0.4% | 23.1% | 16.5% | 40% |
| Regular | 0.1% | 1.9% | 48% | 50% |
| Total | 3% | 30% | 67% | 100% |

Figure 7A:
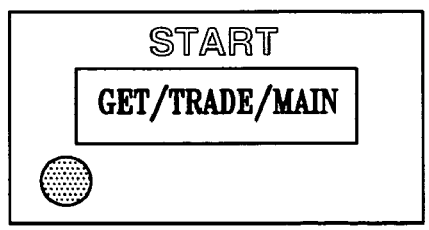
FIGS. 7A-7H are state diagrams that schematically illustrate tier-level message breakdown models, in accordance with an embodiment of the present invention.
Figure 7B:
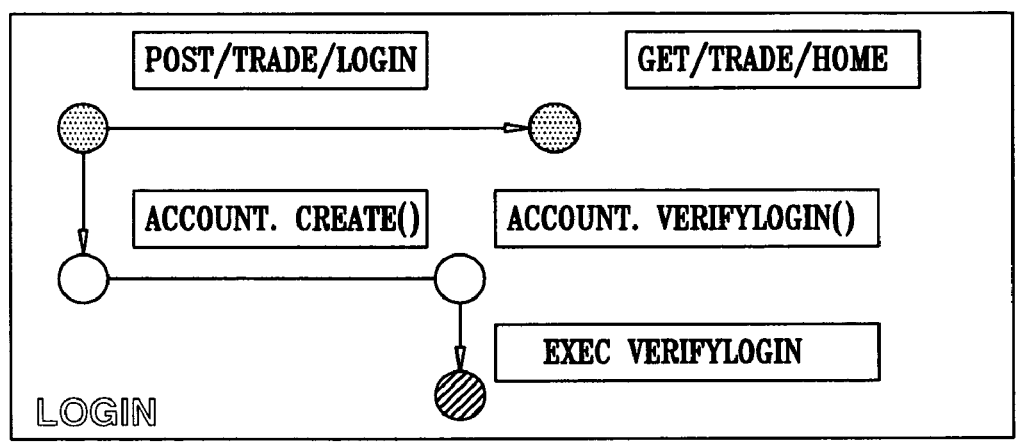
Figure 7C:
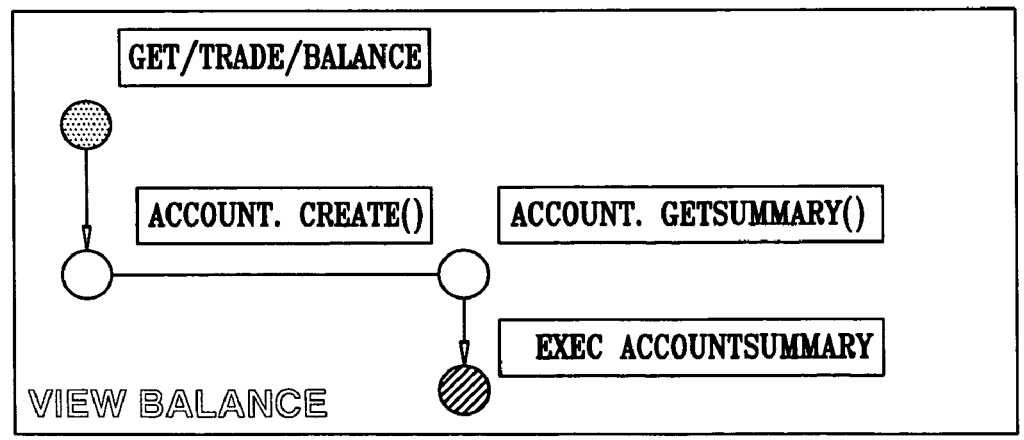
Figure 7D:
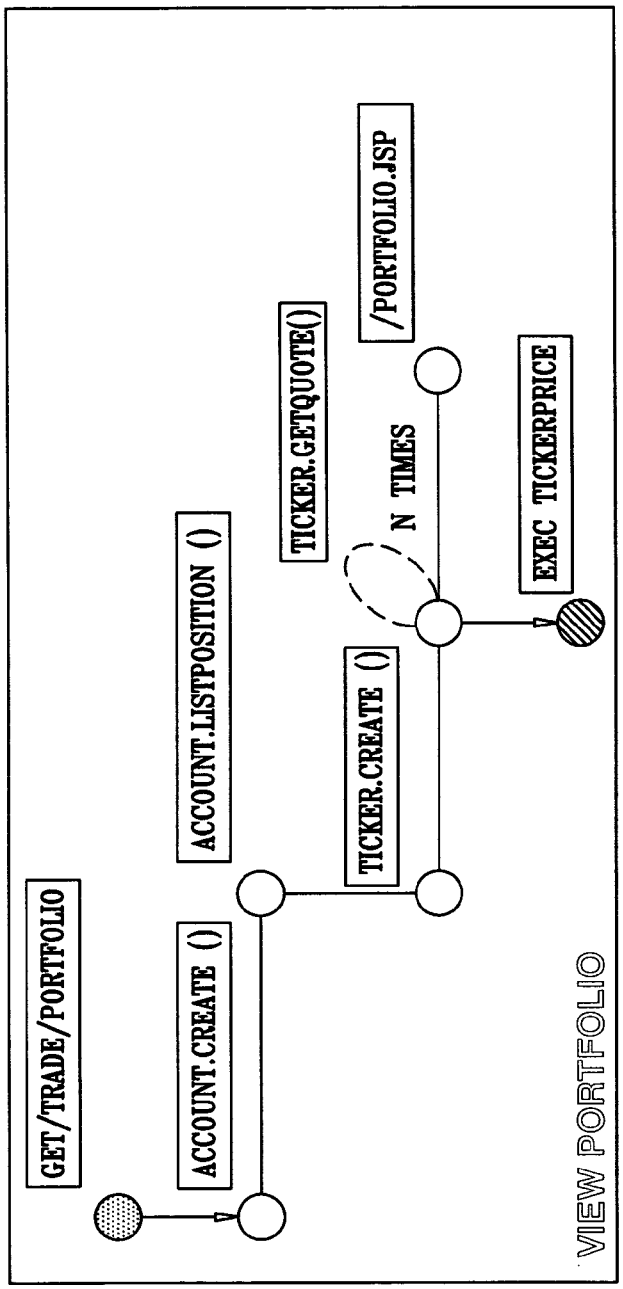
Figure 7E:
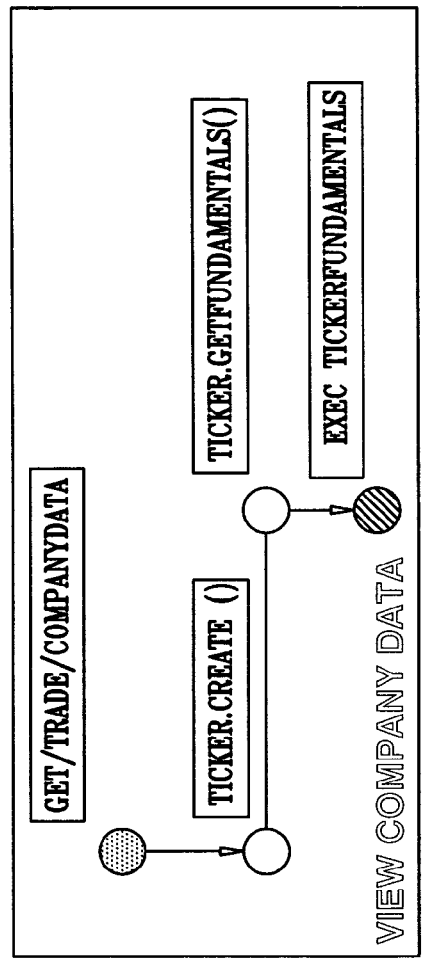
Figure 7F:
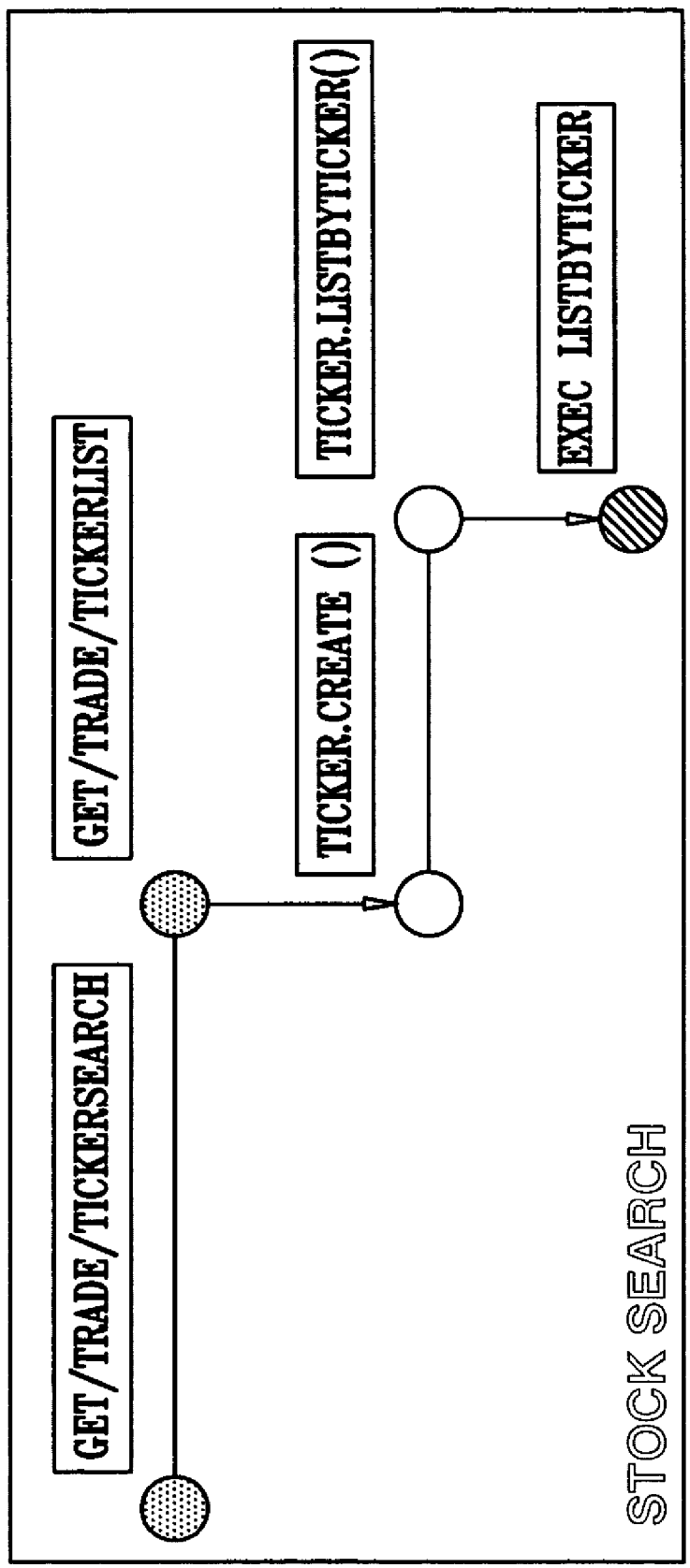
Figure 7G:
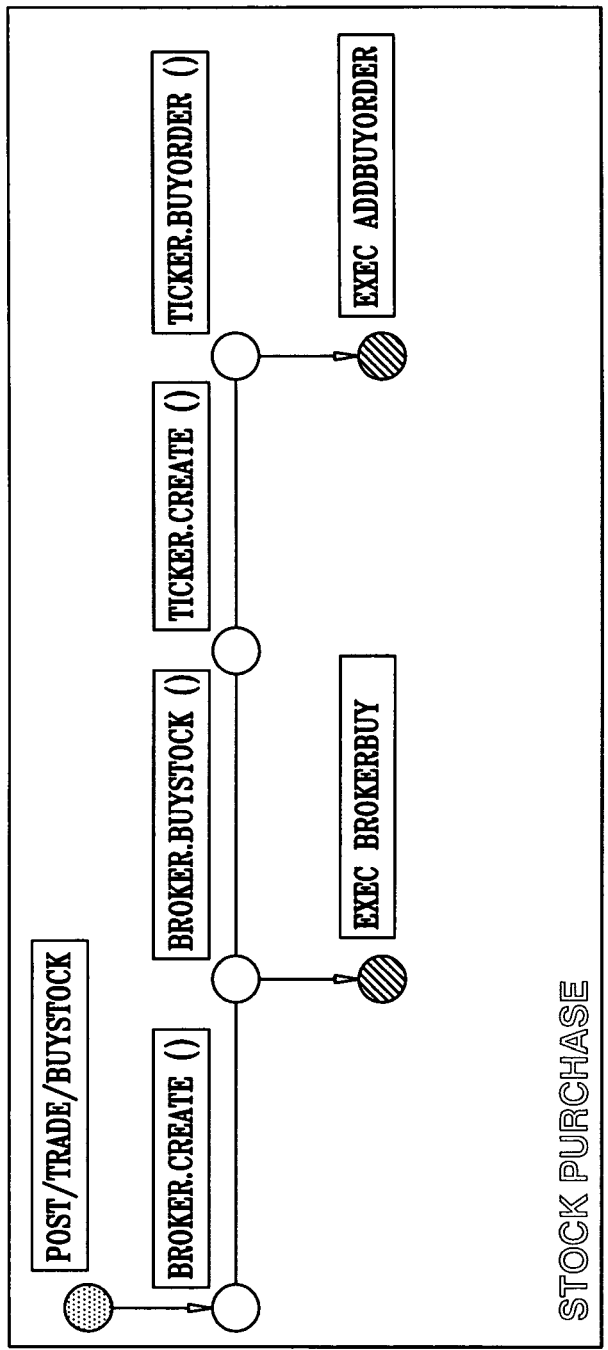
Figure 7H:
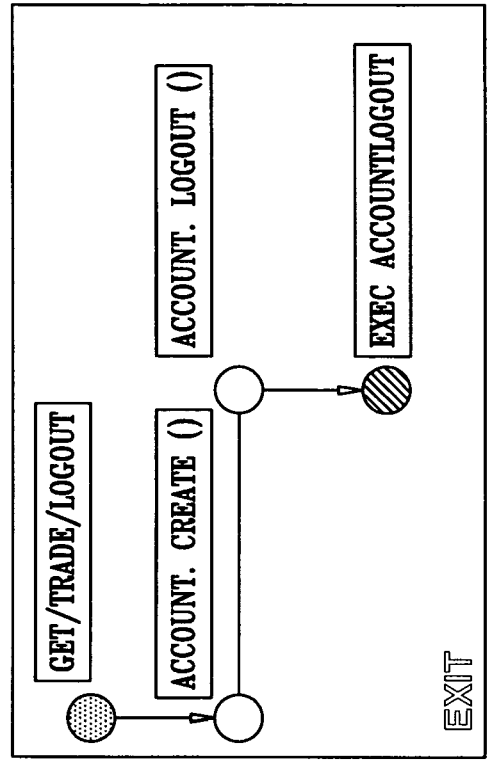

FIGS. 7A-7H are state diagrams that schematically illustrate tier-level message breakdown models, in accordance with an embodiment of the present invention. Each figure shows the message breakdown model of one of the eight client request types in the user behavior models of FIGS. 6A and 6B above. For example, FIG. 7A shows a single task that is performed whenever a client enters the site by sending a "START" client request. The model comprises a single web-server task denoted GET/trade/main, which gets the main HTML page of the application.

FIG. 7B is a state diagram that illustrates the message breakdown model of the "LOGIN" client request type. The different invoked tasks are classified according to the three tiers of site 30. Tasks marked with a dotted shading pattern denote web-tier tasks. Tasks marked with no shading denote application-tier tasks. Tasks marked with a diagonal shading pattern denote database-tier tasks. The connections between tasks mark the different task flows. Horizontal connections denote consecutive flow and vertical connection denotes caller/callee flow, as defined above.

The same notation is used throughout FIGS. 7A-7H. FIG. 7D, which illustrates the "VIEW PORTFOLIO" client request type, shows an example of a probabilistic component in the breakdown model. In "VIEW PORTFOLIO" requests, the client can request several stock quotes simultaneously. Therefore, the task "TICKER.GETQUOTE( )" is invoked N times in a loop. The number of requested quotes N is modeled as a random variable following a suitable discrete probability distribution, such as a Poisson distribution. FIGS. 7A-7H thus collectively present the complete tier-level message breakdown model, which comprises eight graphs—one graph per each client request type in the user behavior model.

The following tables describe the tier-specific resource requirement model used in the present example. Each table comprises the CPU and I/O (database) requirements of each task that appears in the message breakdown diagrams shown in FIGS. 7A-7H above. The numerical values describe the average time, in milliseconds, required by the CPU and/or I/O to perform each task. The three tables list the tasks that belong to the web, application and database tiers of site 30.

| Web-server tier: | | |
|---|---|---|
| Task | CPU | I/O |
| GET/trade/main | 9 | 0 |
| POST/trade/login | 114 | 0 |
| GET/trade/home | 5 | 0 |
| GET/trade/balance | 15 | 0 |
| GET/trade/portfolio | 20 | 0 |
| GET/trade/companyData | 18 | 0 |
| GET/trade/tickerSearch | 7 | 0 |
| GET/trade/tickerList | 65 | 0 |
| POST/trade/buystock | 22 | 0 |
| GET/trade/logout | 12 | 0 |

| Application-server tier: | | |
|---|---|---|
| Task | CPU | I/O |
| Account - create | 4 | 0 |
| Account - VerifyLogin | 32 | 0 |
| Account - GetSummary | 35 | 0 |
| Account - ListPositions | 27 | 0 |
| Account - Logout | 15 | 0 |
| Ticker - create | 4 | 0 |
| Ticker - GetQuote | 17 | 0 |
| Ticker - GetFundamentals | 32 | 0 |
| Ticker - ListByTicker | 18 | 0 |
| Ticker - BuyOrder | 35 | 0 |
| /portfolio.jsp | 10 | 0 |
| Broker - create | 3 | 0 |
| Broker - BuyStock | 70 | 0 |

| Database-server tier: | | |
|---|---|---|
| Task | CPU | I/O |
| exec verifyLogin | 0.2 | 7.5 |
| exec accountSummary | 1.0 | 0.3 |
| exec tickerPrice | 0.3 | 0.2 |
| exec tickerFundamentals | 2.4 | 0.6 |
| exec listByTicker | 9.2 | 0.3 |
| exec brokerBuy | 1.0 | 0.1 |
| exec addBuyOrder | 0.4 | 4.9 |
| exec accountLogout | 0.2 | 0.1 |

The database server can be modeled, for example, as a processor-sharing facility that shares its resources equally among all pending requests. The state vector θ comprises a single element ηN that denotes the total number of active (or pending) requests. The function g(R,θ) updates vector θ each time a new request arrives and each time a serviced request is returned. In this example, updating the vector comprises incrementing or decrementing the value ηN by one.

Referring to the database request types given in the "database-server tier" table above, the response time of each request executed in isolation is the sum of its CPU and I/O times. Assuming that ηN requests are active simultaneously, and that the server resources are allocated evenly to the active requests, the response times returned by function $f(R,\theta)$ would be the following:

| Task | $f(R, \theta)$ |
|---|---|
| exec verifyLogin | $7.7/\eta_N$ |
| exec accountSummary | $1.3/\eta_N$ |
| exec tickerPrice | $0.5/\eta_N$ |
| exec tickerFundamentals | $3.0/\eta_N$ |
| exec listByTicker | $9.5/\eta_N$ |
| exec brokerBuy | $1.1/\eta_N$ |
| exec addBuyOrder | $5.3/\eta_N$ |
| exec accountLogout | $0.3/\eta_N$ |

As noted above, $f(R,\theta)$ returns a response time as if a request of type R has just arrived. The actual remaining time for a specific active request of type R (which has been already partially served for a certain period of time) should be multiplied by a suitable factor. The computation of this remaining time is valid only as long as the state $\theta$ of the model does not change (in our case, no new request arrives and no serviced request is returned). The remaining time of each active request should be recomputed each time state $\theta$ of the model changes.

Using the four automatically-derived models, the simulation tool can model the structure of IT-site 30 and simulate its performance under conditions that closely resemble real-life conditions. As described above, the simulation tool generates client requests in accordance with user behavior model 80 and inserts into these requests attributes, in accordance with user attribute model 82. The resource utilization of each building block of the site, in response to the client requests, is calculated in accordance with tier-specific resource requirement model 84, which was derived based on the task invocation sequences modeled by the tier-level message breakdown model 83.

Although the methods and systems described herein mainly address the optimization of business-related performance in e-business IT-sites, the principles of the present invention can be used to perform capacity planning and performance optimization in other computer systems that process diverse client requests and transactions. Such systems may comprise, for example, various business-to-business (B2B) messaging applications. Other such systems may comprise various exception-handling applications, which process transactions that go through "exceptional" paths, such as transactions handled by a human operator.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for simulating a computer system, comprising:
    defining a set of building blocks comprising models of components of the computer system;
    interconnecting the set of building blocks to produce a topological model of the computer system;
    deriving a client transaction model based on historical data, for generating simulated client requests to be processed by the topological model;
    producing a resource requirement model based on the topological model and on the historical data, the resource requirement model simulating a resource utilization of the components of the computer system responsively to the generated client requests; and
    estimating a performance metric of the computer system by simulating the computer system using the simulated client requests and the resource requirement model,
    wherein deriving the client transaction model comprises deriving a user behavior model comprising one or more session types, which comprise characteristic sequences of client request types, and wherein deriving the user behavior model comprises:
    defining simulated clients;
    defining for each simulated client a session type frequency vector comprising relative frequencies of initiating the one or more session types by the simulated client; and
    classifying the simulated client in a client cluster responsively to the session type frequency vector.

2. The method according to claim 1, wherein the computer system comprises an electronic-business (e-business) website.

3. The method according to claim 1, wherein defining and interconnecting the set of building blocks comprise receiving inputs from a planner using a graphical user interface (GUI) to construct the topological model.

4. The method according to claim 1, wherein defining the set of building blocks comprises defining core infrastructure models that simulate hardware and middleware components of the computer system, and modeling the infrastructure models using at least one of a state-machine model and a queuing network model.

5. The method according to claim 1, wherein defining the set of building blocks comprises, for some of the components, defining two or more alternative building blocks having different levels of complexity.

6. The method according to claim 1, wherein deriving the client transaction model comprises deriving a user attribute model that produces user attributes to be inserted into the generated simulated client requests.

7. The method according to claim 1, wherein producing the resource requirement model comprises producing a tier-level message breakdown model comprising sequences of tasks that are invoked by the respective client request types in the user behavior model.

8. The method according to claim 7, wherein producing the tier-level message breakdown model comprises aggregating, for each client request type in the user behavior model, a plurality of task sequences invoked by the client requests that correspond to the client request type, and representing the plurality of task sequences in terms of a probabilistic graph.

9. The method according to claim 7, wherein producing the resource requirement model comprises determining the resource utilization caused by the tasks in each of a plurality of tiers of the tier-level message breakdown model.

10. The method according to claim 1, wherein producing the resource requirement model comprises deriving a dynamic Bayesian network model responsively to the historic data.

11. The method according to claim 1, and comprising modifying at least one of the topological model, a business-related policy and an IT-related policy, so as to improve the estimated performance metric.

12. The method according to claim 11, wherein estimating the performance metric comprises automatically running a simulation, responsively to an event in the computer system, in order to evaluate a change in the performance metric due to modifying the at least one of the topological model, the business-related policy and the IT-related policy.

13. A method for performing an interactive analysis of a computer system to devise an information technology solution applicable to the computer system, the method comprising:

defining a set of building blocks comprising models of components of the computer system;

interconnecting the set of building blocks to produce a topological model of the computer system; deriving a client transaction model based on historical data, for generating simulated client requests to be processed by the topological model;

producing a resource requirement model based on the topological model and on the historical data, the resource requirement model simulating a resource utilization of the components of the computer system responsively to the generated client requests; and estimating a performance metric of the computer system by simulating the computer system using the simulated client requests and the resource requirement model, wherein deriving the client transaction model comprises deriving a user behavior model comprising one or more session types, which comprise characteristic sequences of client request types, and wherein deriving the user behavior model comprises:

defining simulated clients;

defining for each simulated client a session type frequency vector comprising relative frequencies of initiating the one or more session types by the simulated client; and classifying the simulated client in a client cluster responsively to the session type frequency vector.

14. The method according to claim 13, wherein the computer system comprises an electronic-business (e-business) web-site.

15. The method according to claim 13, wherein defining the set of building blocks comprises defining core infrastructure models that simulate hardware and middleware components of the computer system, and modeling the infrastructure models using at least one of a state-machine model and a queuing network model.

16. The method according to claim 13, wherein defining the set of building blocks comprises, for some of the components, defining two or more alternative building blocks having different levels of complexity.

17. The method according to claim 13, and comprising modifying at least one of the topological model, a business-related policy and an IT-related policy, so as to improve the estimated performance metric.

* * * * *